United States Patent Office 3,539,608
Patented Nov. 10, 1970

3,539,608
TRIALKYL PLUMBIDES AND UNSYMMETRICAL TETRAALKYL LEADS
Theodore Psarras and Charles A. Sandy, Wilmington, Del., assignors to E. I. du Pont de Nemours and Company, Wilmington, Del., a corporation of Delaware
No Drawing. Filed Mar. 22, 1968, Ser. No. 715,152
Int. Cl. C07f 7/24
U.S. Cl. 260—437       15 Claims

ABSTRACT OF THE DISCLOSURE

Processes for preparing (A) alkali metal trialkyl plumbides by contacting a lower tetraalkyl lead and an alkali metal in the presence of a normally liquid, polar aprotic medium and (B) for converting said plumbides to unsymmetrical tetraalkyl leads by contacting said plumbide in the presence of said aprotic medium with an alkylating agent R'X wherein X is a displaceable anion and R' is an alkyl group of up to about 14 carbon atoms and differs from at least one alkyl group of said plumbide. These unsymmetrical tetraalkyl leads are especially useful as antiknock fluid components for gasoline antiknocks.

---

The present invention realtes to preparation of alkali metal trialkyl plumbides, in particular to preparation of such plumbides in a medium which is aprotic and normally liquid at atmospheric pressure. Alkylation of such a plumbide in such a medium produces tetraalkyl leads. If an alkylating agent is utilized which provides an alkyl group that is different from at least one of the alkyl groups of of the plumbide, there results what is called, hereinafter, an unsymmetrical tetraalkyl lead.

BACKGROUND

Alkali metal trialkyl plumbides have been prepared by reacting a tetraalkyl lead with sodium in liquid ammonia at atmospheric pressure and at temperatures down to −70° C. Unsymmetrical tetraalkyl leads have been produced by adding an alkylating agent such as a hydrocarbyl halide to these plumbides in the liquid ammonia.

This liquid ammonia process has a number of deficiencies for commercial operation:

(1) Elaborate and costly insulation or even more costly refrigeration is needed for any reactor destined for use with liquid ammonia at atmospheric pressure. High capacity, refrigerated reflux equipment may also be required to keep the liquid ammonia in the reactor and to prevent venting toxic amounts and even economically important quantities of ammonia to the atmosphere;

(2) A side reaction between the ammonia and the alkali metal always produces an alkali metal amide. A mole of amide is produced for each mole of desired alkali metal trialkyl plumbide. Thus, for each mole of added tetraalkyl lead, at least two moles of alkali metal are used;

(3) When the plumbide in the liquid ammonia medium is used to prepare an unsymmetrical tetraalkyl lead, extra alkylating agent must be added, because both the amide and the plumbide undergo alkylation. Alternately, the amide must be removed before adding the alkylating agent; and (4) Because of the extra cost of removing such amides and because of their hazardous nature when isolated, they are usually left in the liquid ammonia. Alkylation of such amides produces alkylamines. Using such a process for preparing current commercial tetraalkyl leads, the usual alkylating agents, such as ethyl or methyl halides, would provide methyl or ethyl groups, and therefore, methyl or ethylamines. These amines are volatile, highly toxic and malodorous. They would have to be separated substantially completely from the ammonia and the product alkyl leads and recovered by some means. Even recovered, such amines would have only modest commercial value to partially offset high recovery costs.

Some other media which dissolve alkali metals have still further drawbacks. They can react with the metals to produce byproducts which tend to interfere with plumbide formation or to destroy the plumbide. Such undesirable media include water, alcohols, amines with displaceable hydrogen, dimethyl sulfoxide and dimethyl formamide.

It is accordingly among the objects of this invention to provide a process for preparing alkali metal trialkyl plumbides from tetraalkyl leads in a medium which is normally liquid at atmospheric pressure.

Another object is utilization of normally liquid aprotic media which react minimally or not at all with alkali metals to produce by-products, which tend to interfere with plumbide formation or to destroy the plumbides.

A third object is utilization of the alkali metal trialkyl plumbides in the aprotic media as starting materials for preparing unsymmetrical tetraalkyl leads.

BRIEF SUMMARY OF THE INVENTION

These and other objectives are attained according to the present invention by:

(A) A process for preparing alkali metal trialkyl plumbides by contacting a lower tetraalkyl lead (preferably one wherein each alkyl group has from 1 to about 4 carbon atoms) and an alkali metal (preferably sodium or lithium) in a normally liquid, polar aprotic medium (preferably one selected from (a) hexamethylphosphoramide, (b) hexamethylphosphoramide dissolved in a normally liquid aromatic hydrocarbon which contains only carbon and hydrogen, (c) an ether which forms a blue solution when contacted with the alkali metal or (d) an ether as in (c) having dissolved therein at least about 0.2 mole, per mole of the tetraalkyl lead, of a hydrocarbon which forms a charge transfer complex with an alkali metal) at a temperature above the freezing point of the medium and below either the boiling point of the medium or the decomposition temperature of the medium or tetraalkyl lead, whichever of these temperatures is lower (preferably at between about 15° C. and about 60° C.) for a time sufficient to effect conversion of the tetraalkyl lead to the trialkyl plumbide (preferably for a time sufficient to convert a major proportion of the lead, i.e., at least about 90 mole percent); and (B) A process for preparing an unsymmetrical tetraalkyl lead by contacting the trialkyl plumbide from (A) in the aprotic medium from (A) at between about 15° C. and about 60° C. with at least about 1 mole, per mole of the plumbide, of an alkylating agent of the formula R'X, wherein X is a displaceable anion and R' is an alkyl group of from 1 to about 14 carbons which differs from at least one of the alkyl groups of the plumbide (R'X preferably being methyl or ethyl chloride), for a time sufficient to effect conversion of a major proportion (i.e., at least about 90 mole percent) of the plumbide to an unsymmetrical tetraalkyl lead, recovering the unsymmetrical tetraalkyl lead and, optionally, recovering the aprotic medium for reuse.

DETAILED DESCRIPTION OF INVENTION

Preparing an alkali metal trialkyl plumbide by the process of this invention is based on the reaction of Equation 1, that is, the reductive cleavage of a carbon-to-lead bond $$R_4Pb + M \rightarrow R_3PbM + R\cdot \qquad (1)$$

wherein R represents an alkyl, M an alkali metal and R· an alkyl radical. Simply contacting an alkali metal and a tetraalkyl lead produces little, if any, alkali metal trialkyl plumbide. An intermediary, promoting agent tending to dissolve the metal is needed to make the reaction proceed. Classically the promoting agent is liquid ammonia as discussed, for example, by Gilman and Bindschadler in the Journal of Organic Chemistry, vol. 18, pp. 1675 to 1678 (1953). This simple reaction of Equation 1 becomes more complex in liquid ammonia as is illustrated by Equation 2, $$R_4Pb + 2M + NH_3 \xrightarrow{NH_3} R_3PbM + MNH_2 + RH \qquad (2)$$

wherein RH is an alkane and R and M are as in Equation 1. The by-product alkali metal amide, $MNH_2$, is a complicating factor as discussed in the foregoing Background section.

It has now been found, according to the scheme of this invention that the simplicity of Equation 1 may be attained by using a polar aprotic medium to dissolve the alkali metal, which medium is normally liquid at atmospheric pressure. The scheme may be illustrated by Equations 3 and 4 as follows:

$$M + \text{medium} \rightleftharpoons M^+ + [\text{medium} + e^-] \text{ and} \qquad (3)$$

$$R_4Pb + M^+[\text{medium} + e^-] \rightarrow R_3PbM + R \cdot + \text{medium} \qquad (4)$$

wherein $M^+ + [\text{medium} + e^-]$ represents the alkali metal dissolved in the medium. The medium is regenerated intact; and there is little, if any, by-product formed as there is formed in Equation 2. The fate of the alkyl radical is usually disproportionation of two such radicals into an olefin and an alkane or the dimerization of two such radicals to an alkane, R—R.

The metal trialkyl plumbide, $R_3PbM$, may be used in a variety of syntheses, for example in Russian Pat. No. 148,404 the reactions illustrated in Equations 5 and 6 are utilized to prepare a $\beta$-hydroxyethoxytrialkyl lead:

$$R_3PbNa + \overset{O}{\overset{\diagup\diagdown}{CH_2\text{—}CH_2}} \rightarrow R_3PbOCH_2CH_2ONa \qquad (5)$$

$$R_3PbOCH_2CH_2ONa + H_2O \rightarrow R_3PbOCH_2CH_2OH + NaOH \qquad (6)$$

The most important use of alkali metal trialkyl plumbides is for preparing unsymmetrical lower tetraalkyl leads. These unsymmetrical tetraalkyl leads are particularly useful as antiknock fluid components for gasoline antiknocks. Equation 7 illustrates the formation of an unsymmetrical tetraalkyl lead from an alkali metal trialkyl plumbide:

$$R R'R''PbM + R'''XX \rightarrow R R'R''PbR''' + MX \qquad (7)$$

R, R' and R" may be the same or different alkyl groups and R''' is an alkyl group different from at least one of the groups, R, R' or R". X is usually a displaceable anion such as chloride, bromide, iodide, an alkyl sulfate anion or the like.

It should be noted that while the above equations represent the tetraalkyl lead as $R_4Pb$ for simplicity, unsymmetrical tetraalkyl leads may also be employed as an initial reactant such as trimethylethyl lead, dimethyldiethyl lead, methyltriethyl lead, tetradecyltriethyl lead, etc.

As used herein the term aprotic medium means a medium which neither donates nor accepts protons. Aprotic media are known which dissolve an alkali metal. Examples are hexaalkyphosphoramides such as hexamethylphosphoramide, certain ethers such as tetrahydrofuran and 1,2-dimethoxyethane, certain hydrocarbons, dissolved in tetrahydrofuran or 1,2-dimethoxyethane, which hydrocarbons include, for example, biphenyl, napthalene, phenanthrene and pyrene. Schriesheim, in U.S. Pat. No. 3,217,050, teaches that effective aprotic solvents for alkali metals are dipolar organic compounds with high dielectric constants, are non-hydroxylic and without hydrogen atoms replaceable by an alkali metal.

A preferred aprotic solvent or medium for this invention is hexamethylphosphoramide, $[(CH_3)_2N]_3 PO$, in quantity sufficient to afford both at least 1 mole of the phosphoramide per mole of the sodium and enough excess phosphoramide to provide a fluid reaction mass. Especially preferred is a 15 to 45 weight percent solution of hexamethylphosphoramide in a liquid aromatic hydrocarbon, said solution providing about 3–7 moles of phosphoramide per mole of sodium. The hydrocarbon reduces attack of the alkali metal on the phosphoramide. Benzene and toluene are suitable diluents for hexamethylphosphoramide with benzene preferred because, at a given temperature, a hexamethylphosphoramide solution in benzene dissolves more of an alkali metal than does a corresponding concentration of the phosphoramide in toluene. Another preferred medium in this invention consists essentially of a 5 to 20 weight percent solution of naphthalene or biphenyl in tetrahydrofuran or 1,2-dimethoxyethane in an amount sufficient to provide at least about 0.4 mole of the hydrocarbon per mole of sodium. Other suitable aromatic hydrocarbons, which are operable when dissolved in these ethers, are those with a polarographic half-wave reduction potential of about −3 volts as determined at about 25° C. in a solution consisting essentially of 4 weight percent water in dioxane and using a saturated calomel electrode as a reference electrode.

It will be appreciated that the concept of a solution of an alkali metal in such media needs further definition. An alkali metal does not dissolve in these media as does n-hexane in n-heptane, i.e., with substantially no chemical reaction. Alkali metals dissolve in these media by at least two distinct but not fully understood mechanisms. Hexamethylphosphoramide and the ethers, tetrahydrofuran, 1,2-dimethoxyethane and certain other ethers, dissolve an alkali metal by a process of solvating an electron of the metal atom. This solvation is manifested by the formation of a blue colored solution in these media. The blue coloration is characteristic of solvated electrons and since the intensity of the blue is proportional to the concentration of solvated electrons and therefore to the amount of metal dissolved, the dissolution may be monitored photometrically.

Another dissolution mechanism is illustrated by the formation of a charge transfer complex. A solution of naphthalene, biphenyl, phenanthrene, pyrene and other aromatic or aromatically substituted hydrocarbons in an ether such as tetrahydrofuran, 1,2-dimethoxyethane or certain other ethers, can also dissolve an alkali metal. The mechanism here appears to comprise abstraction of an electron from the metal by the hydrocarbon. The hydrocarbon becomes a radical anion and the metal atom becomes a cation. It is probable that dissolution of the metal is driven further to completion by solvation of the cation by the ethers. The whole composite of radical anion and solvated cation is called a charge transfer complex or an electron transfer complex. Since the radical anions in such solution have an unpaired electron, their presence in the solution may be demonstrated by paramagnetic spectroscopic means. Moreover, since the electron transfer complexes are highly and characteristically colored, photometric means may be most conveniently used to monitor their formation.

Embodiments

In an embodiment of this invention an agitatable reactor, which may be of any suitable type from laboratory glassware to commercial reactors of steel, is charged at a temperature above the freezing point of hexamethylphosphoramide and below the decomposiiton temperature of tetraalkyl leads, with a tetraalkyl lead and at least 5 moles, per mole of the tetraethyl lead, of hexamethylphosphoramide. The quantity of phosphoramide is not critical except that an agitatable reaction mass should be obtained. Twice or three times the above minimum amount would also be suitable; more than three times this amount, while operable, would be wasteful of reactor space. Next, agitation is initiated at at least 1 mole per mole of the tetraalkyl lead of an alkali metal (preferably sodium or lithium) is added to the reactor contents. Additions may be by any means which minimize exposure of an alkali metal to moisture or to air (oxygen). Suitable means include extrusion of the metal directly into the reactor contents, addition from a melt of the metal or addition of the metal previously dispersed in an inert carrier, such as a substantially saturated hydrocarbon oil, toluene or benzene.

Agitation of the reactor contents is continued at within the above temperature range until the tetraalkyl lead is converted to an alkali metal trialkyl plumbide. Since such plumbides are colored and since the intensity of the color in the liquid phosphoramide is a measure of the plumbide concentration, the progress and the completion of plumbide formation may be monitored by photometric means.

Alkali metal trialkyl plumbide formation by the above scheme is only mildly exothermic. At the most only minimal cooling of reactor contents by a suitable means will be required.

When plumbide formation is at least substantially complete, at least about 1 mole, per mole of the plumbide, of an alkylating agent (providing an alkyl group different from at least one of the plumbide alkyl groups) is added at within the above temperature range, to the reactor contents, with said contents preferably under continuous agitation.

As used herein the words alkylating agent refer to a compound which provides an alkyl group to replace the alkali metal of the alkali metal plumbide. Useful alkylating agents have the formula R'X. R' is an alkyl group of 1 to about 14 carbons such as methyl, ethyl, n-propyl, isopropyl, n-butyl, sec-butyl, n-tetradecyl and the like. X represents a displaceable anion such as chloride, bromide, iodide or an alkylsulfate anion.

When the color of the trialkyl plumbide is substantially discharged, the formation of an unsymmetrical tetraalkyl lead will be substantially complete. This new alkyl lead may be recovered by any suitable means. The most suitable means is to filter the reactor contents into an excess of water. The filtration serves to trap any residual alkali metal and to prevent its potentially explosive contact with the water. After agitation of the water suspension of the phosphoramide and the new alkyl lead the alkyl lead layer is separated from the water-phosphoramide layer and the alkyl lead, optionally, further purified by vacuum or steam distillation.

It will be appreciated that since this latter of the two reaction steps, vis., alkylation of the plumbide, is exothermic, some means of cooling vessel contents may be required, e.g., by means of cold water flowing through a vessel jacket or by means of controlling rate of addition of alkylating agent or by both means.

The quite valuable hexamethylphosphoramide may be recovered for reuse by fractional distillation of the water-phosphoramide solution. If an excess of alkylating agent has been employed it also may be recovered, for example, by fractional distillation. Any excess alkali metal recovered by filtration may be saved for reuse for example by melting it under water-free and oxygen conditions and then storing the metal as a solid or as a melt.

Preferred embodiments

In a preferred embodiment of this invention a dry reactor, such as one of the types described above, is charged at between about 15° and 60° C., under an inert atmosphere, such as a nitrogen atmosphere, with a 15 to 45% by weight solution of dry hexamethylphosphoramide in dry benzene or in dry toluene, with the dry benzene preferred. By dry is meant hexamethyl phosphoramide containing no more than 0.2% by weight water, and preferably less than 0.1% water and benzene or toluene dried by means of azeotropic distillation. Next, a tetraalkyl lead having alkyl groups of from 1 to about 4 carbon atoms (but most usually 1 to 2 carbon atoms) is charged into the vessel contents in such quantity that theer is from about 0.1 to about 0.5 mole (preferably from about 0.2 to about 0.4 mole), per mole of phosphoramide, of the tetraalkyl lead. Agitation is initiated and the temperature of the reactor contents is readjusted if necessary to from about 15° to about 60° C. (most preferably for reasons of economy in heating and cooling, to from about 20 ot about 30° C.). The heating or cooling may be by any suitable means such as hot or cold water flowing through a coil in the reactor or through an external reactor jacket. At least 1.4 mole (preferably about 2.5 moles) per mole of the tetraalkyl lead, of sodium is added to the vessel contents by any of the means of addition described above. Agitation of vessel contents is continued until substantially all (at least 90 mole percent, preferably at least 95 mole percent) the tetraalkyl lead is converted to sodium trialkyl plumbide as indicated by the photometric test means.

Although only 1 mole of sodium per mole of the tetraethyl lead is required by theory, the use of excess sodium has at least two important advantages. First there is sufficient sodium to react with and use up any residual water or oxygen in the solution of tetraalkyl lead, phosphoramide and aromatic solvent. Second there is more rapid solution of sodium because more sodium surface is available for any given sodium particle size. After sodium trialkyl plumbide formation is complete, the excess sodium may be separated from the plumbide solution by transferring under an inert atmosphere through a filter into another vessel. Conversely the sodium may be left in the solution to be removed after the subsequent alkylation of the plumbide.

It will be appreciated that the time required for completion of sodium trialkyl plumbide formation will depend on the rapidity of sodium dissolution. With finely divided sodium an at the higher limits of the above temperature range, plumbide formation can be accomplished in less than an hour. With larger sodium particles and in the preferred 20 to 30° C. range more than 1 hour may be required to achieve substantial conversion (at least about 90 mole percent, preferably at least about 95 mole percent conversion).

Next, at least 1.5 moles (per mole of plumbide) of an alkyl halide, affording an alkyl group of from 1 to about 14 carbons, which alkyl is different from at least one of the plumbide alkyls, and wherein the halide has an atomic number of at least 17, is added to the plumbide solution under agitation at within the above temperature range. A most preferred addition procedure comprises pumping a 2 to 4 mole (per mole of plumbide) excess of an alkyl chloride, most usually methyl or ethyl chloride, into the contents of the reactor. As suggested above, pumping rate and vessel cooling may be balanced to provide a maximum reaction rate at within the desired temperature range. When the plumbide color has been substantially discharged (i.e., when alkylation is substantially completed), the unsymmetrical tetraalkyl lead solution in benzene or toluene is recovered as described above. The tetraalkyl lead may be recovered from the aromatic hydrocarbon by fractional steam or fractional vacuum distillation. Since benzene and toluene are known thermal stabilizers for alkyl leads, it will be appreciated that it would be preferable to conduct the distillation in such a way as to leave up to about 20% by weight of either of these aromatic hydrocarbons in the alkyl lead distillate.

In another preferred embodiment of the invention, reactions leading to sodium trialkyl plumbide formation and subsequently to unsymmetrical tetraalkyl lead formation are conducted substantially as in the above preferred embodiment, except that a solution of naphthalene in tetrahydrofuran replaces the solution of hexamethylphosphoramide in benzene or toluene. This naphthalene-tetrahydrofuran solution consists essentially of from about 1 to about 3.5 moles, preferably about 1 mole of naphthalene per mole of the sodium and from about 30 to about 35 moles of dry tetrahydrofuran per mole of the naphthalene. Dry tetrahydrofuran herein means a product containing less than 0.2% by weight water and preferably less than 0.1% by weight of water. After all the reaction steps are completed under substantially the same conditions as in the foregoing preferred embodiment, the tetrahydrofuran is recovered by means of an atmospheric pressure distillation followed by a vacuum distillation and the unsymmetrical tetraalkyl lead is recovered from the naphthalene by fractional steam distillation or by fractional vacuum distillation.

It will be appreciated that all the above embodiments are operable and that the preferred embodiments define preferred reagent ratios, times and temperatures for maximum productivity of both sodium trialkyl plumbides and, subsequently, unsymmetrical tetraalkyl leads. The preferences for dry solvents is a practical preference, rather than an absolute necessity. Water tends to slow alkali metal dissolution by coating the surface of the metal with alkali metal hydroxide and also to use up the metal unnecessarily. Oxygen from the air has about the same effect as water. Thus, conducting the reactions under an inert atmosphere is preferred.

In the above embodiments, especially in the preferred embodiments, it will be appreciated that practical utilization of reactor space requires that the reactor be filled to its designed operating volume. On the other hand, the vessel must never be liquid full.

Examples

The following examples more fully illustrate the alkali metal trialkyl plumbide process of this invention, and in particular the flexibility and usefulness of such plumbides in the aprotic media for unsymmetrical tetraalkyl lead syntheses. Unless otherwise stated, parts are by weight.

Example 1

(A) To a dry, glass multi-necked laboratory flask of about 50 parts water capacity, fitted with a nitrogen inlet tube and a methyl chloride bubbler and provided with a magnetic stirrer, are added, at about 25° C., 8 parts (0.045 mole) of hexamethylphosphoramide, having a water content of about 0.1% by weight or less, 3.28 parts (0.009 mole) of tetraethyl lead and 14 parts (0.18 mole) of benzene previously dried by azeotropic distillation. A flow of dry nitrogen is started into vapor space of the flask. Agitation is initiated and 0.48 part (0.021 mole) of sodium, as freshly prepared sections of sodium wire about 2 mm. in diameter and about 1.3 cm. long, is quickly transferred to the flask. The flask contents are agitated at room temperature, 23° to 27° C., for 40 minutes until the dark coloration of the flask contents is at a visual maximum. Next, excess gaseous methyl chloride, 1.5 parts (0.03 mole), is bubbled through the reaction mass. After about 3 minutes of bubbling, the dark contents of the reaction mass turn light tan in color. The flask contents are filtered through a sintered glass filter into 100 ml. of water which water is at about 25° C. The water suspension of alkyl lead product, hexamethylphosphoramide and benzene is vigorously shaken in a separatory funnel and allowed to separate into two layers. The benzene-alkyl lead layer is separated from the phosphoramide-water layer and analyzed by two methods. Total alkyl lead recovery, i.e., the sum of the mole percentages of new unsymmetrical alkyl leads and unreacted tetraethyl lead, if any, is determined by iodine titration. The nature and quantities of the recovered alkyl leads are determined by means of a previously calibrated vapor phase chromatograph. In this Example total alkyl lead recovery was 95 mole percent and the product was substantially pure methyltriethyl lead.

(B) Example 1A repeated at 0° C. afforded greater than 95 mole percent alkyl lead recovery and a mixture comprising about 80 mole percent methyltriethyl lead and 20 mole percent tetraethyl lead.

(C) Example 1A repeated at 80° C. gave substantially complete alkyl lead recovery and methyltriethyl lead containing about 10 mole percent of other tetramethylethyl leads, mostly dimethyldiethyl lead. Thus, some redistribution can occur in this process.

Example 2

(A) In an experiment otherwise substantially identical to Example 1A, the aprotic medium consists essentially of 3.0 parts (0.023 mole) of naphthalene and 22 parts (0.31 mole) of tetrahydrofuran, the tetrahydrofuran containing about 0.1% by weight of water. After filtering the reaction mass into water, the water suspension is extracted with 50 ml. of benzene using a separatory funnel. Analyses of the layer containing the alkyl leads, the benzene and the naphthalene showed 93 mole percent alkyl lead recovery. The alkyl lead recovered was methyltriethyl lead containing about 5 mole percent of other tetramethylethyl leads.

(B) Repeating the above Example 2A at 0° C. provided substantially complete alkyl lead recovery and an alkyl lead mixture containing 70 mole percent methyltriethyl lead and 30 mole percent tetraethyl lead.

(C) Repeating 2A at 60° C., with only a 20 minute reaction time for plumbide formation, gave substantially complete alkyl lead recovery and methyltriethyl lead containing about 6 mole percent of other tetramethylethyl leads.

The foregoing Examples 1 and 2, demonstrate the ease of operation of the highly effective process of this invention. Effective temperature ranges are shown. The utility of two preferred liquid aprotic media are illustrated. The effectiveness of other liquid aprotic media is illustrated in Example 3 following.

Example 3

A series of experiments conducted under the conditions of Example 1A gave the results shown in the following table. In this table, TEL means tetraethyl lead, HMPA is hexamethylphosphoramide and THF means tetrahydrofuran. The total amount of medium was 20 parts. In all the runs shown, alkyl lead recovery was substantially complete, i.e., about 95 mole percent or greater.

| | Medium | Vol. ratio of components of medium | Moles Na used per mole of TEL | Mole percent of $CH_3(C_2H_5)_3Pb$ produced [1] |
|---|---|---|---|---|
| Experiment Number: | | | | |
| 1 | HMPA | | 1.06 | 76 |
| 2 | HMPA | | 1.42 | 90 |
| 3 | THF [2] | | 0.82 | 62 |
| 4 | $C_{10}H_8/CH_3OC_2H_4OCH_3$ | 3:10 | 1.40 | 80 |
| 5 | Biphenyl/THF | 3:10 | 1.40 | [3] 100 |
| 6 | Pyrene/THF | 3:10 | 1.38 | 51 |

[1] The balance of alkyl lead being tetraethyl lead except in Experiment No. 5.
[2] Agitated 80 minutes before adding $CH_3Cl$.
[3] Contains about 2 mole percent of other tetramethylethyl leads, in otherwise substantially pure methyltriethyl lead.

These results show that hexamethylphosphoramide process is effective with as little as 1.06 mole of sodium per mole of tetraethyl lead, but that, in the phosphoramide, an excess of sodium affords an improvement in results. The operability of the pure solvent, tetrahydrofuran, is surprising in that it is known that sodium dissolves in this ether only to the extent of about $10^{-4}$ mole of sodium per liter. The data also show that naphthalene ($C_{10}H_8$) in 1,2-dimethoxyethane is an operable aprotic medium and that biphenyl in tetrahydrofuran is equal in effectiveness to the preferred naphthalene in tetrahydrofuran. That pyrene is less effective than biphenyl in probably a reflection of its lower tendency to abstract an electron from the sodium to form a charge transfer complex. In the polarographic procedure discussed above, biphenyl and naphthalene have polarographic half-wave reduction potentials of —2.8 and —2.6 volts respectively while pyrene has a reduction potential of —2.1 volts.

Example 4

The experiment of Example 1A is repeated with the following reagents.

| | Parts |
|---|---|
| Hexamethylphosphoramide (0.11 mole) | 20 |
| $(CH_3)_4Pb$ (0.007 mole) | 1.87 |
| Sodium (0.013 mole) | 0.3 |

After agitation at room temperature for 50 minutes, excess ethyl chloride is bubbled into the reaction mass until color is discharged. Substantially all the alkyl lead is recovered as a mixture having the following composition.

| Alkyl lead: | Mole percent composition |
|---|---|
| $(CH_3)_4Pb$ | 28 |
| $(CH_3)_3C_2H_5Pb$ | 57 |
| $(CH_3)_2(C_2H_5)_2Pb$ | 13 |
| $CH_3(C_2H_5)_3Pb$ | 1 |
| $(C_2H_5)_4Pb$ | 1 |
| Total | 100 |

The preceding illustrates the operation of the process starting with tetramethyl lead and using ethyl chloride as an alkylating agent.

In the following example the use of an unsymmetrical tetraalkyl lead as a starting material is illustrated.

Example 5

In an experiment run essentially as in Example 2A, 2.8 parts (0.009 mole) of methyltriethyl lead are used as the original tetraalkyl lead. There results substantially complete alkyl lead recovery and the following mixed tetramethylethyl leads.

| Tetramethylethyl leads: | Mole percent composition |
|---|---|
| $(CH_3)_3C_2H_5Pb$ | 8.6 |
| $(CH_3)_2(C_2H_5)_2Pb$ | 47.6 |
| $CH_3(C_2H_5)_3Pb$ | 41.0 |
| $(C_2H_5)_4Pb$ | 2.8 |
| Total | 100.0 |

An important result of the two foregoing examples is that unsymmetrical tetraalkyl leads can be efficiently produced without using redistribution procedures of a more traditional type, viz, catalytic redistribution of mixtures of two different tetraalkyl leads.

Another important result of the process is that the equivalent of commercial redistribution mixtures may be obtained with this process. This result is particularly illustrated by the preceding Example 5.

The following examples illustrate the scope of the invention in terms of the variety of reagents which may be utilized.

Example 6

In a reaction run substantially as in Example 1A, the following reagents and solvents are used.

| | Parts |
|---|---|
| Hexamethylphosphoramide (0.045 mole) | 8 |
| Benzene (0.16 mole) | 13 |
| Sodium (0.021 mole) | 5 |
| Tetrabutyl lead (0.007 mole) | 3.2 |
| Methyl chloride (0.03 mole) | 1.5 |

Upon filtration of the reaction solution into water and separation of the layers, there results a mixture comprising 85 mole percent methyltributyl lead and 15 mole percent unreacted tetrabutyl lead. Total alkyl lead recovery is 70 mole percent based on the orignal amount of tetrabutyl lead.

Example 7

The experiment in Example 3, Experiment No. 2, is repeated with 0.16 g., (0.023 mole) of lithium metal instead of sodium, and two hours' stirring is allowed for the lithium to react with the tetraethyl lead in the hexamethylphosphoramide. These results 98 mole percent recovery of alkyl lead and the composition comprises 52 mole percent of methyltriethyl lead and 48 mole percent of unreacted tetraethyl lead.

Example 8

The experiment in Example 3, Experiment No. 2, is repeated using 10 parts of hexamethylphosphoramide and a 2 to 3 molar excess of methyl iodide instead of methyl chloride. Alkyl lead recovery is substantially complete and the alkyl lead comprises 55 mole percent of methyltriethyl lead and 45 mole percent of unreacted tetraethyl lead.

The following Example 9 demonstrates utilizing n-tetradecyl bromide to alkylate sodium triethyl plumbide to produce n-tetradecyltriethyl lead.

Example 9

In an experiment conducted substantially as in Example 1A, a molar excess of freshly distilled n-tetradecyl bromide is added to the sodium triethyl plumbide in the hexamethylphosphoramide-benzene solution. Alkyl lead recovery is 88 mole percent and the alkyl lead composition is substantially pure n-tetradecyltriethyl lead.

The foregoing detailed description has been given for clearness of understanding only and no unnecessary limitations are to be understood therefrom. The invention is not limited to the exact details shown and described, for obvious modifications will occur to those skilled in the art.

What is claimed is:

1. A process for preparing alkali metal trialkyl plumbides comprising contacting a lower tetraalkyl lead and an alkali metal in a normally liquid, aprotic medium that dissolves an alkali metal with the formation of a colored solution and is otherwise inert, at a temperature above the freezing point of the medium and below the lower of the boiling point of the medium, the decomposition temperature of the medium or the decomposition temperature of the tetraalkyl lead.

2. A process of preparing alkali metal trialkyl plumbides comprising contacting a lower tetraalkyl lead wherein each alkyl group has from 1 to about 4 carbon atoms with at least about one mole, per mole of said tetraalkyl lead, of an alkali metal at a temperature of from about 15° C. to about 60° C. in an aprotic medium selected from the group consisting of (a) hexaalkylphosphoramide, (b) hexaalkylphosphoramide dissolved in an aromatic hydrocarbon solvent which hydrocarbon contains only carbon and hydrogen, (c) an ether which forms a blue solution when contacted with said alkali metal and (d) said ether having dissolved therein a hydrocarbon which forms a charge transfer complex with said alkali metal for a time sufficient to convert a major portion of said tetraalkyl lead to alkali metal trialkyl plumbide.

3. Claim 2 wherein said alkali metal is selected from the group consisting of sodium and lithium.

4. Claim 3 wherein each alkyl group of said tetraalkyl lead contains from 1 to 2 carbon atoms.

5. Claim 4 wherein said aprotic medium is hexamethylphosphoramide in a solvent selected from benzene and toluene.

6. Claim 4 wherein said aprotic medium is an ether selected from the group consisting of tetrahydrofuran and 1,2-dimethoxyethane having dissolved therein a hydrocarbon selected from naphthalene and biphenyl.

7. Claim 2 wherein said alkyl metal trialkyl plumbide is further converted to unsymmetrical tetraalkyl lead by (a) contacting said plumbide in said aprotic medium at from about 15° C. to about 60° C. with at least about 1 mole, per mole of said plumbide, of an alkylating agent of the formula R'X wherein X is a displaceable anion and R' is an alkyl group of from 1 to 14 carbons, which alkyl group is different from at least one alkyl group of said plumbide, for a time sufficient to convert a major portion of said plumbide to an unsymmetrical tetraalkyl lead, and (b) recovering said unsymmetrical tetraalkyl lead from the re action mass.

8. Claim 7 wherein said alkylating agent is an alkyl halide selected from the group consisting of methyl chloride and ethyl chloride.

9. Claim 7 further comprising recovering said medium from said reaction medium for reuse.

10. A process for preparing unsymmetrical tetraalkyl leads wherein each alkyl group contains from 1 to 2 carbon atoms comprising:
 (a) contacting at from about 15° C. to about 60° C. a tetraalkyl lead $R_4Pb$ wherein R is methyl or ethyl with at least 1.4 mole, per mole of said $R_4Pb$, of sodium in a liquid, aprotic medium selected from:
  (1) at least about 3 moles of hexamethylphosphoramide per mole of sodium;
  (2) 15 to 45% by weight solution of hexamethylphosphoramide in a solvent selected from benzene and toluene in an amount containing from about 3 to about 7 moles of said phosphoramide per mole of sodium; and
  (3) a 5 to 20% by weight solution of a hydrocarbon selected from naphthalene and biphenyl in an ether selected from tetrahydrofuran and 1,2-dimethoxyethane in an amount containing at least about 0.4 mole of said hydrocarbon per mole of sodium, for a time sufficient to convert at least about 90 mole percent of said tetraalkyl lead to sodium trialkyl plumbide;
 (b) contacting said plumbide in said aprotic medium at from about 15° C. to 60° C. with at least about 1.5 moles, per mole of said plumbide, of an alkyl halide selected from methyl chloride and ethyl chloride for a time sufficient to convert at least about 90 mole percent of said plumbide to an unsymmetrical tetraalkyl lead; and
 (c) recovering said tetraalkyl lead.

11. Claim 10 wherein said medium is dry hexamethylphosphoramide in dry benzene.

12. Claim 10 wherein said medium is naphthalene in tetrahydrofuran.

13. Claim 10 wherein step (a) and (b) is carried out with agitation under an inert atmosphere.

14. Claim 13 is further comprising recovering said aprotic medium.

15. Claim 14 further comprising recovering excess alkyl halide.

References Cited
UNITED STATES PATENTS 3,088,920   5/1963   Palfrey et al. _____ 260—437 XR

OTHER REFERENCES

Gilman et al., J. Org. Chem., vol. 16 (1951), pp.466–67 and 472.

Chemical Abstracts, vol. 36, pp. 4476[9]–77[4] (1942).

Gilman et al., J. Org. Chem., vol. 18, pp. 1675–78 (1953).

TOBIAS E. LEVOW, Primary Examiner

H. M. S. SNEED, Assistant Examiner